3,451,775
PREPARATION OF ClF AND ClSbF$_6$
Albert W. Jache, North Haven, Santad Kongpricha, Hamden, and James J. Pitts, New Haven, Conn., assignors to Olin Mathieson Chemical Corporation
No Drawing. Filed Oct. 21, 1965, Ser. No. 500,202
Int. Cl. C01b 7/24, 9/08
U.S. Cl. 23—205     1 Claim

ABSTRACT OF THE DISCLOSURE

Chlorine monofluoride is prepared by thermal decomposition of its adduct with antimony pentafluoride, in turn obtained by the reaction of chlorine with liquid hydrogen fluoride in the presence of antimony pentafluoride. The improved process avoids the use of expensive elemental fluorine previously employed in the synthesis of chlorine monofluoride.

---

This invention relates to a novel process for the preparation of chlorine monofluoride and to a novel intermediate therefor. More particularly, this invention relates to the process of preparing chlorine monofluoride by chlorinating hydrogen fluoride in the presence of an antimony fluoride at temperatures of from −78° C. to −20° C. The novel intermediate formed in the process has the formula ClSbF$_6$. On fractionally distilling the reaction mixture containing ClSbF$_6$, chlorine monofluoride is vaporized therefrom. This invention also contemplates the preparation of the novel compound ClSbF$_6$ by direct combination of ClF with SbF$_5$. The novel intermediate is useful for conversion to ClF and SbF$_5$ either in situ or it is suitably separated from the reaction mixture in which it is formed and subsequently decomposed to produce chlorine monofluoride and SbF$_5$.

Chlorine monofluoride is known and useful as a fluorinating agent and as a vigorous oxidizer. It would be valuable as a rocket fuel oxidizer if it could be made cheaply available. The prior art methods for the manufacture of chlorine monofluoride usually require the use of elemental fluorine which is produced electrolytically at high cost.

It is an object of this invention to prepare chlorine monofluoride by a process avoiding costly elemental fluorine. Another object of this invention is to prepare chlorine monofluoride from hydrogen fluoride which is cheaper than elemental fluorine. A further object of this invention is to prepare chlorine monofluoride using cheap elemental chlorine as reagent. Other and further objects appear in the following description.

It has now been found that chlorination of liquid hydrogen fluoride in the presence of antimony fluoride at from −78° to −20° C. produces a reaction mixture containing an adduct of the formula ClSbF$_6$ which when fractionally distilled yields chlorine monofluoride as an over head product. In the chlorination of liquid hydrogen fluoride containing SbF$_5$, suitable temperatures are from about −20° C. to −78° C. Stoichiometric ratios of chlorine, SbF$_5$ and hydrogen fluoride are 1:1:1 but it is convenient to use a considerable excess, up to tenfold or more, of hydrogen fluoride which serves as a solvent for SbF$_5$ at low temperatures. The ratio of chlorine is not critical but the conversion depends on the ratio of chlorine used to SbF$_5$ present and is suitably up to 1:1 on a molar basis. A greater ratio of Cl$_2$:SbF$_5$ leaves considerable unreacted chlorine. It is a surprising feature that the chlorination process of this invention proceeds in the presence of hydrogen fluoride but in its absence, chlorination of SbF$_5$ does not proceed to form ClSbF$_6$ or ClF as products.

The novel adduct is also synthesized by combining chlorine monofluoride with antimony pentafluoride. At −78° C., the novel adduct is a yellow solid. Between −20° and −15° C., the solid darkens and melts to a dark maroon liquid with decomposition to form ClF and SbF$_5$. In this method of synthesis, suitably at least a stoichiometric proportion of chlorine monofluoride over the required 1:1 molar ratio is admixed with SbF$_5$. The excess of ClF is suitably as much as 5:1 or more. The reactants are mixed at room temperature, or even above, or at lower temperatures. The mixture is subsequently cooled to a temperature below −20° C. A temperature of −78° C. is particularly convenient. Excess ClF is removed, suitably by vacuum distillation at that temperature to leave residual ClSbF$_6$.

EXAMPLE I

Antimony pentafluoride (30 g.; 138 millimoles) was poured under a blanket of dry nitrogen into a Kel-F reaction vessel equipped with a Teflon-coated stirring bar. The sealed reactor was attached to an all-metal (copper-Monel) vacuum system and evacuated. The vessel was cooled with a −78° C. bath (trichloroethylene-Dry Ice) and the SbF$_5$ solidified to a white solid.

Anhydrous hydrogen fluoride (32 g.; 1620 millimoles) was distilled into the reactor. The SbF$_5$ dissolved with stirring to yield a colorless solution at −78° C.

Chlorine (7 g.; 99 millimoles) was slowly condensed into the reaction solution with stirring at −78° C. A yellow solution resulted which contained some immiscible droplets of liquid chlorine and a yellow precipitate.

The solution was warmed slowly with stirring to −35° C. at 760 mm. The system was opened to an evacuated Monel cylinder cooled with a liquid nitrogen bath at −196° C. The gaseous products were vacuum distilled into the cylinder until the vapor pressure in the system diminished to zero. Two grams of condensable gas was collected and analyzed on an all-metal (Monel and nickel) vapor phase chromatography (V.P.C.) unit using a column of Kel-F No. 1 oil on Fluor-Pak. The V.P.C. analysis showed the condensate to contain unreacted chlorine, HF and ClF.

The residual reaction solution from above was allowed to warm again toward room temperature. The yellow solid slowly dissolved at about −20° C. The vapor pressure was bled off by vacuum distillation between 0° and 15° C. into an evacuated Monel cylinder cooled with −196° C. liquid nitrogen bath. V.P.C. analysis showed this condensate to contain a large amount of ClF compared to the first sample together with HF and Cl$_2$.

EXAMPLE II

Antimony pentafluoride (18.5 g.; 85 millimoles) was poured under a blanket of dry nitrogen into a Kel-F reaction vessel equipped with a Teflon-coated stirring bar. The sealed reactor was attached to an all-metal (copper-Monel) vacuum system and evacuated.

Chlorine monofluoride (12 g.; 221 millimoles) was bled slowly into the system from a storage cylinder. The clear solution first became yellow-green, then orange-red and finally dark maroon as the gaseous ClF was absorbed over a six hour period. At this point the vapor pressure of the mixture was about one atmosphere and the solution was saturated at room temperature.

A −78° C. bath (trichloroethylene-Dry Ice) was placed around the reaction vessel. On cooling, the vapor pressure dropped to about 300 mm. and a tannish-yellow solid formed. The excess gaseous ClF was evacuated from the system by vacuum distillation.

The resulting solid ClSbF$_6$ product exhibited no observable vapor pressure at −78° C. On careful warming, a measurable vapor pressure was first observed at −40° C. Between −20° and −15° C. the solid darkened, melting to a dark maroon liquid. The extrapolated decomposition temperature, at which the vapor pressure of ClF over the liquid would be 760 mm., was 25° C.

Elemental analysis of this new complex showed for ClF.SbF$_5$: Theory; Cl=13.1%, F=42.1%. Found; Cl=16.3%, F=36.6%. Infrared analysis of a liquid smear between AgCl plates revealed absorption bands assigned to liquid SbF$_5$ plus bands for the SbF$^-_6$ ion and ClF bond.

EXAMPLE III

Gaseous ClF was introduced over a clear solution of 15 g. (0.069 mole) SbF$_5$ in 20 ml. anhydrous liquid HF at —78° C. The ClF was absorbed by the solution, the ClF gas pressure decreasing. A yellow precipitate of ClSbF$_6$ appeared as the ClF was added. After 12 g. (0.22 mole) of ClF had been added in this manner, the reaction vessel was closed and the pressure in the system was 760 mm. The pressure did not change with time. The system was opened to an evacuated Monel cylinder cooled with a —196° liquid nitrogen bath. Excess ClF was vacuum distilled off until the system vapor pressure at —78° C. was approximately zero.

The soltuion containing the yellow ClSbF$_6$ precipitate was warmed from —78° C. toward room temperature. At approximately —20° C. the solution started turning red, the solid slowly disappearing. At 0° C. the solid was gone and the solution was orange-red. Vapor pressure above the solution was 150 mm. Warming was continued to room temperature, the vapor pressure approaching atmospheric. The system was opened again to a pre-evacuated Monel cylinder cooled to —196° C. and a sample of the vapor was vacuum distilled off. V.P.C. showed that ClF and HF were present in gaseous products.

What is claimed is:

1. Process for preparing chlorine monofluoride which comprises mixing chlorine, liquid hydrogen fluoride and antimony pentafluoride at from —78° to —20° C. to form a reaction mixture containing ClSbF$_6$ and fractionally distilling said reaction mixture to separate chlorine monofluoride therefrom.

References Cited

Clark: Halogen Fluorides and Other Covalent Fluorides Physical and Chemical Properties. Chemical Reviews, vol. 58, No. 5, October 1958, pp. 882–883, 888.

EARL C. THOMAS, *Primary Examiner.*

H. S. MILLER, *Assistant Examiner.*

U.S. Cl. X.R.

23—367